United States Patent Office 3,367,833
Patented Feb. 6, 1968

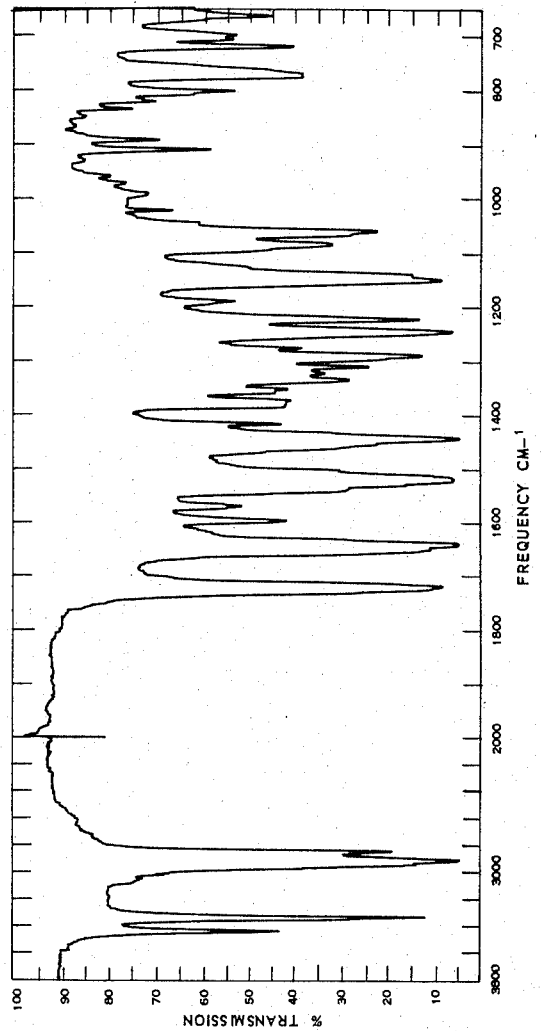

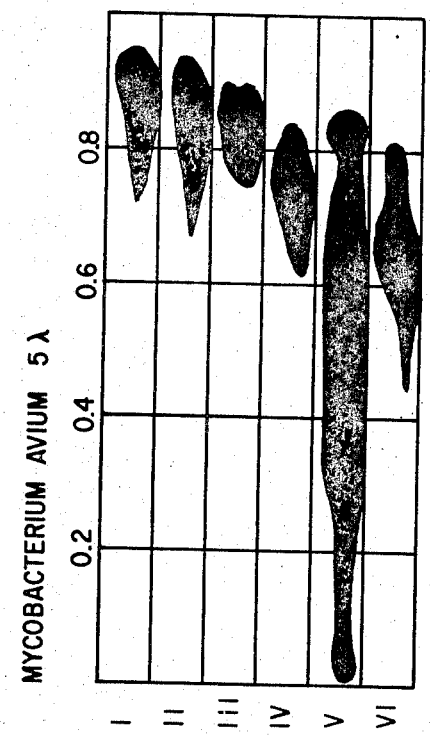

3,367,833
ANTIBIOTIC ERIZOMYCIN AND PROCESS FOR MAKING SAME
Ross R. Herr and Fritz Reusser, Portage, Mich., assignors to The Upjohn Company, Kalamazoo, Mich., a corporation of Delaware
Continuation-in-part of application Ser. No. 582,960, Sept. 29, 1966. This application Feb. 14, 1967, Ser. No. 638,162
10 Claims. (Cl. 167—65)

ABSTRACT OF THE DISCLOSURE

Antibiotic erizomycin producible by culturing *Streptomyces griseus* var. *erizensis* in a nutrient medium. Erizomycin can be used to inhibit the growth of various microorganisms, for example, *E. coli*, *K. pneumoniae*, *P. vulgaris*, *S. aureus*, and *S. faecalis*.

---

This application is a continuation-in-part of the pending application of Ross R. Herr and Fritz Reusser, Ser. No. 582,960, filed in the U.S. Patent Office on Sept. 29, 1966, now abandoned.

BRIEF SUMMARY OF THE INVENTION

Erizomycin is an organic compound producible by culturing an erizomycin-producing actinomycete in an aqueous nutrient medium. It is a basic substance which has the property of adversely affecting the growth of certain organisms, particularly bacteria, for example,

- *Escherichia coli*
- *Klebsiella pneumoniae*
- *Proteus vulgaris*
- *Salmonella typhimurium*
- *Staphylococcus aureus*
- *Streptococcus faecalis*
- *Streptococcus hemolyticus*
- *Streptococcus viridans* and can be used alone or in combination with other antibacterial agents to prevent the growth of, or reduce the number of, such organisms present in various environments. For example, it can be used as an oil preservative, for example, as a bacteriostatic agent for inhibiting the growth of *Proteus vulgaris* which is known to cause spoilage in cutting oils. Also, it is useful in wash solutions for sanitation purposes, as in the washing of hands and the cleaning of equipment, floors, or furnishings of contaminated rooms or laboratories; it is also useful as an industrial preservative, for example, as a bacteriostatic rinse for laundered clothes and for impregnating papers and fabrics; and it is useful for suppressing the growth of sensitive organisms in plate assays and other microbiological media. It can also be used as a feed supplement to promote the growth of animals, for example, mammals, birds, fish, and reptiles.

BRIEF DESCRIPTION OF THE DRAWING

FIGURE 1—Infrared absorption spectrum of erizomycin.
FIGURE 2—Papergram of erizomycin.

DETAILED DESCRIPTION

Chemical and physical properties of erizomycin

Elemental analyses: Calcd. for $C_{27}H_{32}N_4O_8$: C, 59.99; H, 5.96; N, 10.37; O, 23.68. Found: C, 59.97; H, 6.05; N, 10.46; O, 22.88. Molecular weight: 540 (mass spectrometer).

*Ultraviolet spectrum.*—Erizomycin has the following UV absorption spectrum:

In EtOH solution:

| λ max. (in mμ) | a |
|---|---|
| 221 (sh) | 42.01 |
| 255 (sh) | 9.45 |
| 262 | 8.56 |
| 269 | 7.52 |
| 303 | 16.38 |
| ~350 | 0.32 |

*Optical rotation.*—$[\alpha]_D^{25} = -82°$ (c=1.35, EtOH).

*Solubility.*—At room temperature, approximate solubilities in mg./ml. are as follows:

| | |
|---|---|
| Water | <1 |
| 95% EtOH | >10 |
| Ethyl acetate | >10 |
| Acetone | >10 |
| Methylene chloride | >100 |
| Benzene | ~2 |
| Skellysolve B | <1 |
| n-Butanol | ~5 |

*Melting point.*—214–217° C.

*Infrared spectrum.*—The infrared absorption spectrum of erizomycin suspended in mineral oil mull is reproduced in FIGURE 1 of the drawing. Erizomycin gives bands at the following wave lengths expresed in reciprocal centimeters:

| | |
|---|---|
| 3445 (M) | 1247 (S) |
| 3460 (S) | 1225 (S) |
| 3440 (S) | 1195 (M) |
| 3200 (W) | 1191 (M) |
| 3060 (W) | 1152 (S) |
| 2950 (S) (oil) | 1145 (S) |
| 2920 (S) (oil) | 1130 (M) |
| 2850 (S) (oil) | 1097 (M) |
| 2730 (W) | 1087 (S) |
| 2620 (W) | 1069 (S) |
| 1725 (S) | 1062 (S) |
| 1655 (S) | 1047 (W) |
| 1645 (S) | 1035 (W) |
| 1620 (W) | 1024 (W) |
| 1600 (M) | 1012 (W) |
| 1572 (M) | 992 (W) |
| 1540 (M) | 973 (W) |
| 1522 (S) | 960 (W) |
| 1505 (M) | 952 (W) |
| 1472 (M) | 932 (W) |
| 1465 (M) | 911 (M) |
| 1458 (M) (oil) | 888 (W) |
| 1447 (S) | 885 (W) |
| 1420 (M) | 867 (W) |
| 1388 (M) | 850 (W) |
| 1384 (M) | 835 (W) |
| 1376 (M) (oil) | 822 (W) |
| 1360 (M) | 808 (W) |
| 1355 (M) | 802 (M) |
| 1338 (S) | 772 (M) |
| 1325 (M) | 720 (M) |
| 1314 (S) | 706 (M) |
| 1300 (S) | 698 (M) |
| 1293 (S) | 670 (W) |
| 1278 (M) | 662 (M) |
| 1272 (W) | |

Erizomycin when pressed in a KBr disc gives bands at the following wave lengths expresed in reciprocal centimeters:

| | |
|---|---|
| 3485 (W) | 1358 (M) |
| 3420 (W) | 1320 (S) |
| 3370 (M) | 1290 (S) |
| 3210 (W) | 1248 (S) |
| 3035 (M) | 1224 (S) |
| 2980 (M) | 1190 (M) |

| | |
|---|---|
| 2940 (M) | 1150 (S) |
| 2880 (M) | 1132 (S) |
| 2760 (W) | 1085 (S) |
| 2630 (W) | 1068 (S) |
| 1725 (S) | 1050 (M) |
| 1679 (S) | 1025 (M) |
| 1655 (S) | 1015 (W) |
| 1645 (S) | 995 (W) |
| 1595 (M) | 965 (W) |
| 1575 (M) | 930 (W) |
| 1540 (M) | 907 (W) |
| 1538 (S) | 890 (W) |
| 1515 (S) | 876 (W) |
| 1477 (M) | 835 (W) |
| 1465 (M) | 810 (M) |
| 1458 (S) | 780 (M) |
| 1448 (S) | 755 (M) |
| 1424 (M) | 717 (M) |
| 1380 (M) | 660 (M) |

Band intensities are indicated as S, M, and W, respectively, and are approximated in terms of the backgrounds in the vicinity of the bands. An S band is of the same order of intensity as the strongest in the spectrum; M bands are between one-third and two-thirds as intense as the strongest band, and W bands are less than one-third as intense as the strongest band. These estimates are made on the basis of a percent transmission scale.

PAPERGRAM PATTERN

Erizomycin has a characteristic papergram pattern as shown in FIGURE 2 of the drawing when using the following solvent systems:

(I) 1-butanol, water (84:16), 16 hours.
(II) 1-butanol, water (84:16) plus 0.25% p-toluene-sulfonic acid, 16 hours.
(III) 1-butanol, acetic acid, water (2:1:1), 16 hours.
(IV) 2% Piperidine (v./v.) in 1-butanol, water (84:16), 16 hours.
(V) 1-butanol, water (4:96), 5 hours.
(VI) 1-butanol, water (4:96) plus 0.25% p-toluene-sulfonic acid, 5 hours.

Antitumor activity of erizomycin

Erizomycin is active against KB cells (human epidermoid carcinoma cells) in tissue culture. The $ID_{50}$ is 4.4 mcg./ml. of erizomycin.

Antibacterial activity of erizomycin tube dilution assay

| Test microorganism: | Minimum inhibitory, Concentration in mcg./ml. |
|---|---|
| Escherichia coli | 125 |
| Klebsiella pneumoniae | 125 |
| Proteus vulgaris | 250 |
| Salmonella paratyphi | 250 |
| Salmonella pullorum | 62.5 |
| Salmonella typhimurium | 125 |
| Streptococcus faecalis | 125 |
| Streptococcus hemolyticus | 250 |
| Streptococcus viridans | 250 |
| Staphylococcus aureus | 250 |

The tube dilution assay procedure was conducted with the medium BHI (Brain Heart Infusion Broth, Difco, Detroit, Mich.). Assay tubes (13 mm. x 100 mm.) were prepared in the customary manner as set out in Snell, E. E., Vitamin Methods, volume 1, Academic Press, Inc., New York 1950, p. 327. Test organisms grown for 18 hours at 37° C. were used to inoculate the test medium. The assays were read at 17 hours.

THE MICROORGANISM

The actinomycete used according to this invention for the production of erizomycin is *Streptomyces griseus* var. *erizensis* var. nova. One of its strain characteristics is the production of erizomycin. A subculture of the living organism can be obtained from the permanent collection of the North Utilization and Research Division, Agricultural Research Service, U.S. Department of Agriculture, Peoria, Ill., U.S.A. Its accession number in this repository is NRRL 3242.

*Streptomyces griseus* var. *erizensis* was compared with *Streptomyces griseus* Waksman #4, ATCC 10137. Both microorganism cultures have cream to cream-olive aerial growth; flexuous sporophores; smooth-walled spores; and grow best at 24–28° C. *Streptomyces griseus* var. *erizensis* is distinguished from *Streptomyces griseus* by the production of the antibiotic erizomycin and by color differences as noted in the tables, hereinafter disclosed, for Ektachromes, cultural, and color characteristics.

*Streptomyces griseus* var. *erizensis* and *Streptomyces griseus* Waksman #4, ATCC 10137 are compared in the following tables:

Table I—Appearance on Ektachrome.
Table II—Microscopic characteristics.
Table III—Cultural characteristics.
Table IV—Growth on carbon compounds in synthetic medium.
Table V—Color characteristics.

TABLE I

Appearance of *S. griseus* var. *erizensis* and *S. griseus*, ATCC 10137 on Ektachrome*

| Agar Medium | *S. griseus* var. *erizensis* | *S. griseus*, ATCC 10137 |
|---|---|---|
| Bennett's: | | |
| Surface | Pink-white | Cream-pink. |
| Reverse | Yellow | Yellow-tan. |
| Czapek's Sucrose: | | |
| Surface | Pink-white | Pink-white. |
| Reverse | Colorless | Colorless. |
| Maltose-Tryptone: | | |
| Surface | Pink-white | Pink. |
| Reverse | Tan | Pink-tan. |
| Peptone-Iron: | | |
| Surface | Trace white | No aerial growth. |
| Reverse | Yellow-tan | Yellow-tan. |
| 0.1% Tyrosine: | | |
| Surface | Trace white | Trace white. |
| Reverse | Pale-yellow | Pale-yellow. |
| Casein Starch: | | |
| Surface | Pink-white | Pink-white. |
| Reverse | Pink-tan | Pink-tan. |

* Dietz, A.: "Ektachrome Transparencies as Aids in Actinomycete Classification," Annals of the New York Academy of Sciences, 60: 152–154, 1954.

TABLE II

Microscopic characteristics of *S. griseus* var. *erizensis* and *S. griseu* ATCC 10137

| | *S. griseus* var. *erizensis* | *S. griseus* ATCC 10137 |
|---|---|---|
| Light Microscope | Sporophores long, flexuous. | Sporophores straight, to flexuous. |
| Electron Microscope: | | |
| Direct | Spores smooth, rectangular. | Spores smooth, sausage-like. |
| Carbon replica | Spores ridged with heavy surface marking. Some spores with dark central spot. | Spores ridged with heavy surface marking and dark central spot. |

TABLE III

Cultural characteristics of *S. griseus* var. *erizensis* and *S. griseus*, ATCC 10137

| Medium | *S. griseus* var. *erizensis* | *S. griseus* ATCC 10137 |
|---|---|---|
| Peptone Iron Agar: | | |
| Surface | White | Trace white. |
| Reverse | Yellow | Yellow. |
| Other | Melanin | Melanin. |
| Calcium Malate Agar: | | |
| Surface | Trace white | Cream. |
| Reverse | Cream-pink | White. |
| Other | Pale pink pigment. Malate solubilized. | No pigment. Malate solubilized. |

TABLE III

Cultural characteristics of *S. griseus* var. *erizensis* and *S. griseus*, ATCC 10137

| Medium | *S. griseus* var. *erizensis* | *S. griseus* ATCC 10137 |
| --- | --- | --- |
| Glucose Asparagine Agar: | | |
|   Surface | Fair pink-white | Cream. |
|   Reverse | Cream | Yellow. |
|   Other | Trace Yellow pigment | Yellow pigment. |
| Skim Milk Agar: | | |
|   Surface | Very slight trace white | No aerial growth. |
|   Reverse | Yellow-tan | Yellow-tan. |
|   Other | ----do | Do. |
| | Casein solubilized | Casein solubilized. |
| Tyrosine Agar: | | |
|   Surface | Cream | White. |
|   Reverse | Yellow-tan | Yellow-tan. |
|   Pigment | ----do | Do. |
| | Tyrosine solubilized | Tyrosine solubilized. |
| Xanthine Agar: | | |
|   Surface | Cream | Trace white. |
|   Reverse | Yellow | Yellow. |
|   Other | Pale yellow pigment | Pale yellow pigment. |
| | Xanthine solubilized | Xanthine solubilized. |
| Yeast Extract-Malt Extract Agar: | | |
|   Surface | Cream | Cream. |
|   Reverse | Olive-tan | Yellow-tan. |
|   Other | Pale yellow pigment | Pale yellow pigment. |
| Casein-Starch Agar: | | |
|   Surface | Olive-cream | Cream. |
|   Reverse | Pink | Pink-tan. |
|   Other | Trace pink pigment | Trace pink pigment. |
| | Starch hydrolyzed | Starch hydrolyzed. |
| Bennett's: | | |
|   18° C.: | | |
|     Surface | Cream-olive | Cream-white. |
|     Reverse | Yellow | Olive. |
|     Pigment | No pigment | Trace olive. |
|   24° C.: | | |
|     Surface | Cream-olive | Cream-tan. |
|     Reverse | Olive-tan | Yellow-tan. |
|     Pigment | No pigment | Trace yellow. |
|   28° C.: | | |
|     Surface | Cream-olive | Cream-tan. |
|     Reverse | Olive | Yellow-tan. |
|     Pigment | Trace olive | Trace yellow. |
|   37° C.: | | |
|     Surface | No aerial growth | Very slight trace cream aerial. |
|     Reverse | Poor, colorless | Yellow-tan. |
|     Pigment | No pigment | Trace yellow. |
|   55° C | No growth | No growth. |
| Czapek's Sucrose Agar: | | |
|   18° C.: | | |
|     Surface | Trace cream-olive | Trace cream-olive. |
|     Reverse | Cream | Cream. |
|   24° C.: | | |
|     Surface | Trace cream aerial | Trace cream aerial. |
|     Reverse | White | Cream. |
|   28° C.: | | |
|     Surface | Cream | Cream-olive. |
|     Reverse | ----do | Do. |
|   37° C.: | | |
|     Surface | No aerial growth | No aerial growth. |
|     Reverse | Colorless | Colorless. |
|   55° C | No growth | No growth. |
| Maltose Tryptone Agar: | | |
|   18° C.: | | |
|     Surface | Cream | Cream-olive. |
|     Reverse | Olive | Olive. |
|     Pigment | None | Trace olive. |
|   24° C.: | | |
|     Surface | Cream | Cream. |
|     Reverse | Olive-tan | Yellow-tan. |
|     Pigment | None | Trace-yellow. |
|   28° C.: | | |
|     Surface | Cream-olive | Cream. |
|     Reverse | Olive | Yellow-tan. |
|     Pigment | Trace olive | Trace yellow. |
|   37° C.: | | |
|     Surface | No aerial growth | No aerial growth. |
|     Reverse | Colorless | Yellow-tan. |
|     Pigment | None | Do. |
|   55° C | No growth | No growth. |
| Plain Gelatin | Complete liquefaction | Complete liquefaction. |
| Nutrient Gelatin | ----do | Do. |
| Synthetic Nitrate Broth | Trace colorless vegetative growth at base. | Colorless surface pellicle and flocculent growth at base. |
| | Nitrates reduced to nitrites. | Nitrates not reduced to nitrites. |
| Nutrient Nitrate | Heavy white aerial growth on surface pellicle. | White aerial growth on surface pellicle. |
| | Slight vegetative growth at base. | Compact vegetative growth at base. |
| | Nitrates reduced to nitrites. | Nitrates reduced to nitrites. |
| Litmus Milk | White aerial growth on blue surface ring. | Trace white aerial growth on blue surface ring. |
| | Partial peptonization. | Complete peptonization. |
| | pH 7.9. | pH 7.9. |

TABLE IV

Growth of *S. griseus* var. *erizensis* and *S. griseus*, ATCC 10137 on carbon compounds in synthetic medium (J. Bact. 56: 107–114, 1948)

| | *S. griseus* var. *erizensis* | *S. griseus* ATCC 10137 |
| --- | --- | --- |
| Control | (−) | (−) |
| 1. D-xylose | + | + |
| 2. L-arabinose | + | (+) |
| 3. Rhamnose | (−)(+)(−)* | (−) |
| 4. D-fructose | + | + |
| 5. D-galactose | + | + |
| 6. D-glucose | + | + |
| 7. D-mannose | + | + |
| 8. Maltose | + | + |
| 9. Sucrose | (−) | (−) |
| 10. Lactose | + | + |
| 11. Cellobiose | + | + |
| 12. Raffinose | (−) | (−) |
| 13. Dextrin | + | + |
| 14. Inulin | (−) − | (−) |
| 15. Soluble Starch | + | + |
| 16. Glycerol | + | + |
| 17. Dulcitol | (+)(−)(−) | (−) |
| 18. D-mannitol | (−)++ | + |
| 19. D-sorbitol | +(−)(−) | (−) |
| 20. Inositol | (−)(−)(+) | (−) |
| 21. Salicin | (−) − − | (−) |
| 22. Phenol | (−) − − | − |
| 23. Cresol | − − − | − |
| 24. Na Formate | (−) − − | − |
| 25. Na Oxalate | (−)−(−) | − |
| 26. Na Tartrate | (−)−(−) | − |
| 27. Na Salicylate | (−) − − | − |
| 28. Na Acetate | +(+) | + |
| 29. Na Citrate | + | + |
| 30. Na Succinate | + | + |

+ = Good growth.
(+) = Moderate growth.
(−) = Slight growth.
− = No growth.
*Variability in results with different operators.

TABLE V

Color Characteristics of *S. griseus* var. *erizensis* and *S. griseus*, ATCC 10137

| Agar Medium | Color Harmony Manual 3rd Ed., 1948 | | N.B.S. Circular 553, 1955 | |
| --- | --- | --- | --- | --- |
| | *S. griseus* var. *erizensis* | *S. griseus*, ATCC 10137 | *S. griseus* var. *erizensis* | *S. griseus*, ATCC 10137 |
| Bennett's: | | | | |
|   Surface | 1½db(g) parchment | 2db(g) ivory | 89gm pale yellow | 89gm pale yellow; 90g grayish-yellow; 121m pale yellow-green. |
|   Reverse | 2gc(g) bamboo, chamois | 3ng(g) yellow-maple | 90gm grayish-yellow | 77m moderate yellowish-brown. |
| Czapek's Sucrose: | | | | |
|   Surface | 2cb(m) ivory tint | 2cb(m) ivory tint | | |
|   Reverse | 2db(g) ivory | 2db(g) ivory | | |
| Maltose Tryptone: | | | | |
|   Surface | 2ba(m & g) pearl, shell tint | 2cb(m) ivory tint | 92gm yellowish-white | 92gm yellowish-white; 93gm yellowish-gray. |
|   Reverse | 2ie(g) light mustard-tan | 3ng(g) yellow-maple | 91gm dark grayish-yellow; 94g light olive-brown; 106g light olive. | 77m moderate yellowish brown. |

The new compound of the invention is produced when the elaborating organism is grown in an aqueous nutrient medium under submerged aerobic conditions. It is to be understood, also, that for the preparation of limited amounts, surface cultures in bottles can be employed. The organism is grown in a nutrient medium containing a carbon source, for example, an assimilable carbohydrate, and a nitrogen source, for example, an assimilable nitrogen compound or proteinaceous material. Preferred carbon sources include glucose, brown sugar, sucrose, glycerol, starch, corn starch, galactose, dextrin, molasses, and the like. Preferred nitrogen sources include corn steep liquor, yeast, autolyzed brewer's yeast with milk solids, soybean meal, cottonseed meal, corn meal, milk solids, pancreatic digest of casein, distiller's solubles, fish meal, animal peptone liquors, meat and bone scraps, and the like. A combination of these carbon and nitrogen sources can be used advantageously. Trace metals, for example, zinc, magnesium, manganese, cobalt, iron, and the like need not be added to the fermentation since tap water and unpurified ingredients are used as media components.

Production of the compound of the invention can be effected at any temperature conducive to satisfactory growth of the microorganism, for example, between about 18° and 40° C. and preferably between about 25° and 30° C. Ordinarily, optimum production of the compound is obtained in about 2 to 10 days. The medium normally stays fairly close to neutral, or on the alkaline side during the fermentation. The final pH is dependent, in part, on the buffers present, if any, and in part on the initial pH of the culture medium which is advantageously adjusted to about pH 6–8 prior to sterilization.

When growth is carried out in large vessels and tanks, it is preferable to use the vegetative form, rather than the spore form of the microorganism for inoculation to avoid a pronounced lag in the production of the new compound and the attendant inefficient utilization of equipment. Accordingly, it is desirable to produce a vegetative inoculum in a nutrient broth culture by inoculating the broth culture with an aliquot from a soil or slant culture. When a young, active, vegetative inoculum has thus been secured, it is transferred aseptically to large vessels or tanks. The medium in which the vegetative inoculum is produced can be the same as, or different from, that utilized for the production of the new compound, as long as it is such that a good growth of the microorganism is obtained.

The new compound of the invention is a basic compound having the empirical formula $C_{27}H_{32}N_4O_8$. At room temperature, erizomycin is soluble to the extent of approximately less than 1 mg./ml. in water; >10 mg./ml. in 95% ethanol; >10 mg./ml. in ethyl acetate; >10 mg./ml. in acetone; >100 mg./ml. in chloroform; about 2 mg./ml. in benzene; <1 mg./ml. in Skellysolve B (petroleum ether or n-hexane); and approximately 5 mg./ml. in n-butanol.

A variety of procedures can be used in the isolation and purification of erizomycin, for example, solvent extraction, liquid-liquid distribution in a Craig apparatus, use of adsorbents, and chromatography columns. Solvent extraction procedures are preferred for commercial production inasmuch as they are less time consuming and less expensive, and higher recovery yields are obtained thereby.

In a preferred recovery process, the mycelium and undissolved solids are first separated from the fermentation beer by conventional means such as filtration with the use of a filter aid (or by centrifugation). The filtered beer (or centrifuged beer) is extracted with a solvent for erizomycin. Ethyl acetate is preferred. The ethyl acetate extract containing erizomycin is washed with a one-tenth volume of water and then the ethyl acetate extract is evaporated under reduced pressure to obtain a dry crude preparation of erizomycin. This preparation can be used in environments where higher purity of the antibiotic is not necessary. Further purification of this erizomycin preparation can be accomplished by dissolving the crude erizomycin preparation in a minimum amount of solvent for erizomycin (ethyl acetate is preferred) and then adding about 10 volumes of cyclohexane. The precipitate which forms is collected by filtration and dissolved in ethyl acetate. The cyclohexane filtrate is discarded. The ethyl acetate containing the erizomycin is filtered and the filtrate then evaporated to dryness under reduced pressure. The dry preparation containing erizomycin is then dissolved in a solvent for erizomycin (methylene chloride is preferred) and the solution filtered. The filtrate is evaporated to dryness under reduced pressure to give a relatively pure preparation of erizomycin. Crystalline erizomycin can be obtained by subjecting this relatively pure preparation of erizomycin to partition chromatography purification on buffered diatomaceous earth using the solvent system toluene-propyleneglycol. Crystalline erizomycin obtained from the column fractions can be recrystallized from ethanol to give a high purity crystalline preparation of erizomycin.

Because of the basic nature of erizomycin, the crude product obtained initially from the fermentation beer by ethyl acetate extraction can be purified by extracting the active material into water at a pH of about 2 to 3, then adjusting the pH to 9 to 10 and reextracting into ethyl acetate, or other solvent in which erizomycin is soluble. After removal of the solvent, the residue can be further purified by crystallization, counter-current distribution, or chromatography as disclosed above.

Alternatively, the new compound of the invention can also be recovered from the filtered beer by adsorption on cation exchange resins. Both the carboxylic and sulfonic acid types can be used. Suitable carboxylic acid resins include the polyacrylic acid resins obtained by the copolymerization of acrylic acid and divinylbenzene by the procedure given on p. 87 of Kunin, Ion Exchange Resins, 2nd edition (1958), John Wiley and Sons, Inc. Carboxylic acid cation exchange resins of this type are marketed under the trade names Amberlite IRC–50 and Zeokarb 226. Suitable sulfonic acid resins include nuclear sulfonate polystyrene resins cross-linked with divinylbenzene which are obtained by the procedure given on p. 84 of Kunin, supra. Sulfonated cation exchange resins of this type are marketed under the trade names Dowex–50, Amberlite IR–120, Nalcite HCR, Chempro C–20, Permutit Q, and Zeokarb 225.

The antibiotic is eluted from the resin with an acid, advantageously at a pH lower than the pKa of the cation exchange resin used. Satisfactory results are obtained with a pH of about 1 to 6. The eluate is adjusted to about pH 7.5 to 8.5 with a base, e.g., sodium hydroxide, or a strongly basic anion exchange resin, and the antibiotic is extracted with a water-immiscible solvent according to the process described above. [Suitable anion exchange resins for this purpose are obtained by chloromethylating by the procedure given on pp. 88 and 97 Kunin, supra, polystyrene cross-linked, if desired, with divinylbenzene prepared by the procedure given on p. 84 of Kunin, supra, and quaternizing with trimethylamine or dimethylethanolamine by the procedure given on p. 97 of Kunin, supra. Anion exchange resins of this type are marketed under the trade names Dowex–2, Dowex–20, Amberlite IRA–400, Duolite A–102, and Permutit S–1.]

The novel compound of the invention also can be recovered from harvested beers and other aqueous solutions by adsorption on a surface active adsorbent, for example, Florisil (a synthetic siliacte of the type described in U.S. Patent 2,393,625 and sold by the Floridin Company), decolorizing carbon, or decolorizing resins, and eluting the adsorbed material with a solvent. Any of the solvents mentioned above can be used. A suitable decolorizing resin is Permutit DR (U.S. Patent 2,702,263).

The new compound of the invention also can be purified by successive transfers from protonated to non-protonated forms and vice versa, especially with other types of treatments intervening as, for example, solvent extractions and washings, chromatography, and fractional liquid-liquid extraction. In this manner salts of erizomycin can be employed to isolate or upgrade the antibiotic. For example, the antibiotic can be converted to an insoluble salt, such as the picrate, which can be subjected to purification procedures and then used to regenerate the antibiotic free base by treatment with alkali. Or the antibiotic can be converted to a water-soluble salt, such as the hydrochloride or sulfate, and the aqueous solution of the salt extracted with various water-immiscible solvents before regenerating the antibiotic free base by treatment with alkali of the thus-extracted acid solution.

Salts of erizomycin can be used for the same biological purposes as the free base or they can be employed to upgrade the antibiotic as previously described.

Specific acid salts can be made by neutralizing the free base with the appropriate acid to below about pH 7.5, and advantageously to about pH 2 to pH 6. Suitable acids for this purpose include hydrochloric, sulfuric, phosphoric, acetic, succinic, citric, lactic, maleic, fumaric, pamoic, cholic, palmitic, mucic, camphoric, glutaric, glycolic, phthalic, tartaric, lauric, stearic, salicyclic, 3-phenylsalicylic, 5-phenylsalicylic, 3-methylglutaric, orthosulfobenzoic, cyclohexanesulfamic, cyclopentanepropionic, 1,2-cyclohexanedicarboxylic, 4-cyclohexenecarboxylic, octadecenylsuccinic, octenylsuccinic, methanesulfonic, benzenesulfonic, heliantic, Reinecke's, dimethyldithiocarbamic, sorbic, monochloroacetic, undecylenic, 4'-hydroxyazobenzene-4-sulfonic, octadecylsulfuric, picric, benzoic, cinnamic, and like acids.

The new compound of the invention, erizomycin, is active against *Escherichia coli* and can be used to reduce, arrest, and eradicate slime production in papermill systems caused by its antibacterial action against this microorganism. It can also be used to prolong the life of cultures of *Trichomonas foetus*, *Trichomonas hominis*, and *Trichomonas vaginalis* by freeing them of *Escherichia coli* contamination.

The following examples are illustrative of the process and products of the present invention but are not to be construed as limiting. All percentages are by weight and all solvent mixture proportions by volume unless otherwise noted.

EXAMPLE 1

A. *Fermentation.*—A soil stock of *Streptomyces griseus* var. *erizensis*, NRRL 3242, was used to inoculate 500 ml. Erlenmeyer seed flasks containing 100 ml. of sterile seed medium consisting of the following ingredients:

| | G. |
|---|---|
| Glucose monohydrate | 25 |
| Pharmamedia [1] | 25 |
| Tap water q.s., 1 liter. | |

[1] Pharmamedia is an industrial grade of cottonseed flour produced by Trader's Oil Mill Company, Fort Worth, Tex.

The seed medium pre-sterilization pH was 7.2. The seed inoculum was grown for 3 days at 28° C. on a Gump rotary shaker operating at 250 r.p.m.

Seed inoculum, as prepared above, was used to inoculate 500 ml. Erlenmeyer fermentation flasks containing 100 ml. of sterile fermentation medium consisting of the following ingredients.

| | g./liter |
|---|---|
| Sucrose | 20 |
| Soybean meal | 20 |
| Calcium carbonate | 5 |
| Tap water, balance. | |

The fermentation flasks were inoculated at the rate of 5 ml. of seed inoculum per 100 ml. of fermentation medium. The pre-sterilization pH of the fermentation flask medium was 7.2. The fermentation flasks were grown for 5 days at a temperature of 28° C. on a Gump rotary shaker operating at 250 r.p.h. Maximum production of the antibiotic in a flask fermentation is generally realized in 2 to 3 days after which the titer of the antibiotic gradually drops off. In a typical shake flask fermentation, the shake flask beer assayed 9 biounits/ml. of erizomycin after one day; 11 biounits/ml. of erizomycin after two days; and 10 biounits/ml. of erizomycin after three days of fermentation time. The assay was an agar disc-plate assay against the microorganism *B. cereus*. The assay against *Bacillus cereus* is conducted on agar buffered to pH 7.4 with pH 7.4 phosphate buffer. A unit volume (0.08 ml.) of solution containing the substance to be assayed is placed on a 12.7 mm. paper disc which is then placed on an agar plate seeded with the assay organism. The agar plate is then incubated for 16–18 hours at 32° C. A biounit (BU) is defined as the concentration of the antibiotic which gives a 20 mm. zone of inhibition under the standard assay conditions. Thus, if for example a fermentation beer has to be diluted $1/100$ to give a 20 mm. zone of inhibition, the potency of such beer is 100 BU per ml.

B. *Extraction.*—Whole beer (3450 ml.) from an erizomycin fermentation, as described above, assaying 4.4 biounits/ml. of erizomycin was filtered with the aid of diatomaceous earth. The cake was washed with a 10% volume of water. The filtered beer and wash were combined (3410 ml. assaying 3.8 biounits/ml.). The filtered beer and wash were extracted with an equal volume of ethyl acetate. The ethyl acetate extract was washed with one-tenth volume of water. The washed ethyl acetate extract was then evaporated under reduced pressure to a crude dry preparation (350 mg.) of erizomycin assaying 32.8 µg./mg. of erizomycin on the *B. cereus* assay.

C. *Purification.*—A crude preparation of erizomycin (704 grams assaying 53 g./mg. on the *B. cereus* assay) obtained by the above disclosed procedure, was dissolved in a minimum amount of ethyl acetate and added to 10 volumes of cyclohexane with good mixing. The precipitate which formed was collected by filtration and dissolved in approximately 2100 ml. of ethyl acetate. The cyclohexane filtrate was discarded. The ethyl acetate solution containing the erizomycin was filtered and the solids discarded. The filtrate was then evaporated to dryness under reduced pressure at less than 40° C. The dry residue from the ethyl acetate extract was dissolved in 420 ml. of methylene chloride and the solution filtered. The solids were discarded and the filtrate was evaporated under reduced pressure to yield a relatively pure dry preparation of erizomycin weighing 146 grams and assaying 200 µg./mg. on the *B. cereus* assay.

Further purification of the erizomycin preparation was achieved using a partition chromatography column which was prepared as follows: To a "rolling slurry" of 120 grams of buffered diatomaceous earth in "half-saturated" toluene was added 40 ml. of propylene glycol. Stirring was continued for about 10 minutes to insure good mixing. The mixture was poured into a one inch diameter glass column and packed under 4 p.s.i. air pressure. The packed column was topped with a one-quarter inch layer of sea sand. [The "half-saturated" toluene, which was used above, was prepared as follows: With good mixing, 4 ml. propylene glycol was added to one gallon of toluene. This gave a solution about half-saturated and was used as the mobile phase in the partition chromatography column. The buffered diatomaceous earth used in the partition chromatography column was prepared as follows: To 100 g. of diatomaceous earth, 100 ml. of a solution of $KH_2PO_4$ in water (27.2 g./liter), and 100 ml. of a solution of $NA_2HPO_4$ in water (28.4 g./liter) was added with good mixing. The mixture was then dried thoroughly at 120° C.]

A 2.2 g. portion of an erizomycin preparation, prepared by the methylene chloride extraction procedure described above, was dissolved in 7.3 ml. of propylene glycol by heating on the steam bath with stirring. This solution was mixed with 15 g. of buffered diatomaceous earth, slurried with a minimum amount of half-saturated toluene and packed on top of the partition chromatography column. A one-quarter inch level of sea sand was placed on top of the column. The column was eluted with half-saturated toluene at a flow rate of about 2 ml./minute. Fractions (20 ml.) were collected. Fractions 26–44 were combined, washed with water to remove the glycol, and evaporated to dryness under reduced pressure; yield 698 mg. This material was recrystallized from about 10 ml. ethanol; yield, 343 mg. crystalline erizomycin assaying 420 μg./mg. on the *B. cereus* assay.

EXAMPLE 2

*Erizomycin hydrochloride*

One gram of erizomycin, prepared as in Example 1, is dissolved in 20 ml. of methylene chloride. The solution is filtered and hydrogen chloride gas is bubbled into the solution. The precipitate of erizomycin hydrochloride which forms is filtered and dried.

Erizomycin has antifungal activity as determined by a standard agar dilution plate assay. It has good activity against *Nocardia asteroides* and marginal activity against *Histoplasma capsulatum. Nocardia asteroides,* which causes nocardiosis, has been isolated from soils and laboratory air. Thus, erizomycin can be used to treat soils infected with *Nocardia asteroides. Histoplasma capsulatum,* which causes histoplasmosis, has been isolated from storm cellars and chicken houses. Thus, erizomycin can be used to treat such environments when they become infected with *Histoplasma capsulatum.*

We claim:

1. A composition of matter assaying at least 9 biounits of erizomycin per ml., a compound which (a) is effective in inhibiting the growth of various Gram-negative and Gram-positive bacteria, and in its essentially pure crystalline form, (b) is soluble in ethyl acetate, ethanol, acetone, and methylene chloride;

(c) has the following elemental analyses: C, 59.97; H, 6.05; N, 10.46; O, 22.88;

(d) has a molecular weight of 540 as determined by mass spectrometer;

(e) has a characteristic infrared absorption spectrum as shown in FIGURE 1 of the accompanying drawing; and (f) has a characteristic papergram pattern as shown in FIGURE 2 of the accompanying drawing.

2. The composition of matter of claim 1 in dry form, said composition of matter assaying at least 32.8 μg./mg. on the *Bacillus cereus* assay.

3. The compound, erizomycin, according to claim 1, in its essentially pure form.

4. The compound, erizomycin, according to claim 1, in its essentially pure crystalline form.

5. A compound selected from the group consisting of erizomycin, according to claim 1, and the acid addition salts thereof.

6. The composition of matter of claim 1 in the form of its hydrochloride salt.

7. A process for making the compound defined in claim 1 which comprises cultivating *Streptomyces griseous* var. *erizensis* in an aqueous nutrient medium under aerobic conditions until substantial antibiotic activity is imparted to said medium by the production of erizomycin, and isolating erizomycin from the culture medium.

8. A process according to claim 7 which comprises cultivating *Streptomyces griseus* var. *erizensis* in an aqueous nutrient medium under aerobic conditions until substantial antibiotic activity is imparted to said medium by the production of erizomycin.

9. A process according to claim 7 which comprises cultivating *Streptomyces griseus* var. *erizensis* in an aqueous nutrient medium containing a source of assimilable carbohydrate and assimilable nitrogen under aerobic conditions until substantial antibiotic activity is imparted to said medium by the production of erizomycin, and isolating the erizomycin so produced.

10. A process according to claim 9 in which the isolation comprises filtering the medium, extracting the resulting filtrate with a water-immiscible solvent for erizomycin, and recovering erizomycin from the solvent extract.

References Cited

UNITED STATES PATENTS 3,300,382 1/1967 Bergy et al. ---------- 167—65

ALBERT T. MEYERS, *Primary Examiner.*

J. GOLDBERG, *Assistant Examiner.*